United States Patent [19]

Tsukuda et al.

[11] Patent Number: 4,730,999

[45] Date of Patent: Mar. 15, 1988

[54] NEGATIVE PRESSURE SUPPLY APPARATUS FOR AUTOMOBILES

[75] Inventors: Yoshiaki Tsukuda, Naka; Akira Tomita, Mito, both of Japan

[73] Assignee: Hitachi, Ltd., Tokyo, Japan

[21] Appl. No.: 893,251

[22] Filed: Aug. 5, 1986

[30] Foreign Application Priority Data

Aug. 5, 1985 [JP] Japan .................. 60-171070
Sep. 4, 1985 [JP] Japan .................. 60-193774

[51] Int. Cl.⁴ ............................. F16D 31/02
[52] U.S. Cl. ........................ 417/44; 60/397; 60/410; 123/198 C; 417/480
[58] Field of Search ............ 417/44, 413, 38, 255, 417/422, 480; 60/397, 410, 411; 123/198 R, 198 C, 389

[56] References Cited

U.S. PATENT DOCUMENTS

| | | | |
|---|---|---|---|
| 1,183,129 | 5/1916 | Small | 417/480 |
| 1,347,194 | 7/1920 | Washington | 417/44 X |
| 2,042,510 | 6/1936 | Cornelius et al. | 417/44 |
| 2,095,475 | 10/1937 | Kittler | 417/480 X |
| 2,278,832 | 4/1942 | Cornelius | 417/480 X |
| 2,634,885 | 4/1953 | North | 417/44 X |
| 4,070,133 | 1/1978 | McCormick | 417/38 |
| 4,328,669 | 5/1982 | Mort | 60/397 |

FOREIGN PATENT DOCUMENTS

| | | | |
|---|---|---|---|
| 131505 | 11/1978 | Japan | 417/366 |
| 9115 | 3/1984 | Japan. | |

*Primary Examiner*—Leonard E. Smith
*Attorney, Agent, or Firm*—Antonelli, Terry & Wands

[57] ABSTRACT

The vacuum tank is connected to an engine intake manifold, and a vacuum pump generates compulsarily a negative pressure so as to maintain the negative pressure at a predetermined setting pressure value. The vacuum pump has a diaphragm pump for discharging air in the vacuum tank a motor for driving the diaphragm pump. The vacuum tank pump is disposed in the vacuum tank. A vacuum switch assembly and the diaphragm pump are disposed on the vacuum tank. The motor is installed entirely in the vacuum tank. The volume of a negative pressure supply apparatus can be reduced, and the installing location of the negative pressure supply apparatus can be disposed at liberty.

16 Claims, 9 Drawing Figures

NEGATIVE PRESSURE SUPPLY APPARATUS FOR AUTOMOBILES

BACKGROUND OF THE INVENTION

1. Field of the Invention

The present invention relates to a negative pressure supply apparatus for automobiles, and more particularly, to a negative pressure supply apparatus for automobiles having a vacuum tank which stores a negative pressure therein and a vacuum pump which generates compulsorily the negative pressure to the vacuum tank.

2. Description of Prior Art

A negative pressure supply apparatus for automobiles stores a negative pressure generated from an engine intake manifold for automobiles in a vacuum tank, and supplies the negative pressure to a control apparatus for a driving force source as occasion demands.

The negative pressure supply apparatus for automobiles includes a vacuum tank which generates compulsorily the negative pressure in the vacuum tank when the negative pressure in the vacuum tank goes over a predetermined setting pressure value and becomes toward an atmospheric pressure.

The negative pressure supply apparatus for automobiles supplies a negative pressure of above a predetermined setting pressure value to the control apparatus. The negative pressure supply apparatus stores an engine negative pressure in the vacuum tank via a check valve and consumes the negative pressure in the vacuum tank by operation of the control apparatus. When the engine negative pressure becomes low, for example turbo operating time, acceleration stepping time etc, the negative pressure in the vacuum tank becomes low and the control apparatus beings to operate abnormally.

To prevent the above inconveniences, the negative pressure in the vacuum tank is detected by a vacuum switch, and a motor rotates to operate a vacuum pump. Then the vacuum pump discharges air in the vacuum tank outside and the negative pressure value in the vacuum tank as raised above the predetermined setting pressure value. The check valve compares the engine negative pressure with the negative pressure in the vacuum tank and, when the engine negative pressure is higher than the negative pressure in the vacuum tank, the air in the vacuum tank flows into the engine.

In, for example, Japanese Utility Model Publication No. 9115/1984, a negative pressure supply apparatus for automobiles is proposed which is designed to integrate a vacuum tank with a vacuum pump. In the negative pressure supply apparatus proposed in the above Japanese Utility Model Publication, the vacuum tank is side by side with the vacuum pump. A motor for driving the vacuum pump is disposed on an intermediate space formed between the ouside of the vacuum pump and the outside of the vacuum tank. The vacuum pump is united with the vacuum tank, so that the piping structure for connecting between the vacuum pump and the vacuum tank is abolished and the negative supply apparatus structure is simplified.

However, the establishment spaces of the vacuum pump and the vacuum tank exist separately and distinctly, and further the motor for driving the vacuum pump is disposed outside of the vacuum pump. Accordingly, in the conventional negative pressure supply apparatus for automobiles, the establishment spaces of the negative pressure supply apparatus become large and the establishment place is not allowed to be freely in the negative pressure supply apparatus.

SUMMARY OF THE INVENTION

An object of the present invention is to provide negative pressure supply apparatus for automobiles wherein the volume of the negative pressure supply apparatus can be reduced.

Another object of the present invention is to provide a negative pressure supply apparatus for automobiles wherein a dead space of the negative pressure supply apparatus can be reduced.

Further object of the present invention is to provide a negative pressure supply apparatus for automobiles wherein an installing location of the negative pressure supply apparatus can be disposed at liberty.

Still another object of the present invention is to provide a negative pressure supply apparatus for automobiles wherein an operating negative pressure of a vacuum switch assembly can be adjusted steppedly.

A negative pressure supply apparatus for automobiles comprises a vacuum tank section being connectd to an engine intake manifold, and a vacuum pump section for generating compulsorily a negative pressure so as to maintain the negative pressure at a predetermined setting pressure value, the vacuum pump section having a pump means for discharging air in the vacuum tank section, a motor for driving the pump means, and an electric wire member being connected the pump driving motor.

In accordance with advantageous features of the negative pressure supply apparatus for automobiles of the present invention, the vacuum tank pump section is disposed in the vacuum tank section. A vacuum switch assembly and a diaphragm pump means is disposed on the vacuum tank section. A motor for driving the diaphragm pump means is installed entirely in the vacuum tank section.

According to the present invention, both the vacuum pump section and the motor for driving the vacuum pump section are disposed in the vacuum tank, the volume of the negative pressure supply apparatus can be reduced, and the installing location of the negative pressure supply apparatus can be disposed at liberty.

DETAILED DESCRIPTION OF PREFERRED EMBODIMENTS

Figure 1:
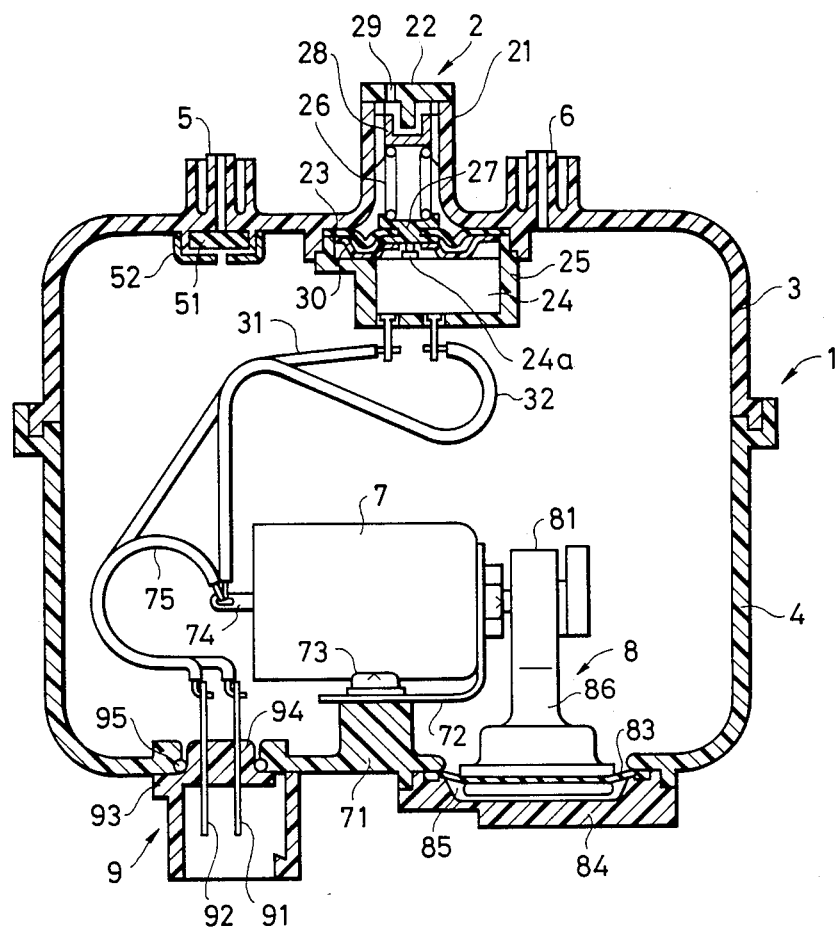
FIG. 1 is a cross-sectional view of one embodiment of a negative pressure supply apparatus according to the present invention.

Referring now to the drawings wherein like reference numerals are used throughout the various views to designate like parts and, more particularly, to FIG. 1, according to this figure, a negative pressure supply apparatus for automobiles includes a vacuum tank 1. The vacuum tank 1 is constituted by two parts which are an upper case 3 and a lower case 4. The vacuum tank 1 forms a barrel-like shape as a whole. The upper case 3 and the lower case 4 of the vacuum tank 1 are constructed of resin material, respectively. The upper case 3 and the lower case 4 are sealed in fluid sealing relationship at the division surface by bonding or welding.

A vacuum switch assembly 2 is provided at the inner central portion of the upper case 3. The vacuum switch assembly 2 closes an electric circuit when the negative pressure in the vacuum tank 1 goes over a predetermined setting pressure value and becomes toward an atmospheric pressure, comparing the negative pressure in the vacuum tank 1 with the pressure in the atmosphere.

The construction of the vacuum switch assembly 2 will be described with detail. A cylindrical portion 21 is formed integrally on the outer center part of the upper case 3. An upper opening of the cylindrical portion 21 and an inner end opening of the cylindrical portion 21 are covered with a lid 22 and a switch diaphragm member 23, respectively. A microswitch 24 is fixed with a cap 25 to the inside wall of the upper case 3. The switch diaphragm member 23 is pushed with pressure to the inside wall of the upper case 3 by the cap 25 and fastened thereto. As a result the inner portion of the cylindrical portion 21 and the inner portion of the upper case 3 are completely separated with the switch diaphragm member 23.

A spring member 26 is disposed in the inner space of the cylindrical portion 21. One end of the spring member 26 contacts a spring receiving member 27 and another end of the spring member 26 contacts to an adjustment screw member 28. The spring receiving member 27 is fixed at the upper central portion of the switch diaphragm member 23. A small hole 29 for introducing the atmospheric pressure is provided through the lid 22. The spring receiving member 27 passes through the switch diaphragm member 23 and extends to the opposite side of the switch diaphragm member 23 and faces to a contact knob 24a provided on the microswitch 24.

A spring member 30 is provided between the switch diaphragm member 23 and the microswitch 24. The spring member 30 gives to the switch diaphragm member 23 a pressing area and a pressing force between the switch diaphragm member 23 and the inside wall of the upper case 3, owing to the switch diaphragm member 23 being installed to the inside wall of the upper case 3. The spring member 30 also gives the switch diaphragm member 23 the pressing force which opposes the pressing force of the spring member 26.

When the negative pressure in the vacuum tank 1 has enough negative pressure value, the switch diaphragm member 23 is pressed by the force of the spring member 26. Therefore, the contact knob 24a of the microswitch 24 is pressed with the spring receiving member 27, then the electric contact between a lead wire 31 and a lead wire 32 becomes an open state.

When the negative pressure in the vacuum tank 1 has insufficient negative pressure value, the negative pressure goes over the predetermined setting pressure value and toward the atmospheric pressure. Then, the force of the spring member 30 overcomes the elastic force of the spring member 26 and shifts the switch diaphragm member 23 toward the upper portion. As a result the contact knob 24a of the microswitch 24 is released from the switch diaphragm member 23 and the electric contact between the lead wire 31 and the lead wire 32 becomes a closed state. Then the operation of the motor driving type vacuum pump is controlled.

A nipple 5 is formed projectedly and integrally with the upper case 3. The nipple 5 receives one end of a hose which is connected at its other end to an engine intake manifold for communicating the vacuum tank 1 with the engine intake manifold. An annular projection member for installing a check valve 51 is formed integrally with the upper case 3 surrounding the inner opening end of the nipple 5. After the check valve 51 is inserted in the inside of the annular projection member, a cap 52 having a hole is inserted and fastened on the outside of the annular projection member. Therefore, the check valve 51 is installed in the inner wall of upper case 3.

An output nipple 6 for supplying the negative pressure to a control apparatus is formed projectedly and integrally with the upper case 3. In this embodiment, the output nipple 6 connects an end of a hose thereto, however a three way type electromagnetic valve may be installed on an output port of the vacuum tank 1 and outputs either the negative pressure or the atmospheric pressure instead of the output nipple 6.

A motor support member 71 for supporting a motor 7 is formed integrally with the inside wall of the lower case 4. L-shaped bracket 72 is formed on the motor 7. The bracket 72 is screwed with a screw member 73 to the motor support member 71. Then the motor 7 is fixed to the inside wall of the lower case 4.

A crank mechanism 81 of a diaphragm pump 8 as a vacuum pump is formed on one end of a shaft 76 of the motor 7. The crank mechanism 81 causes a pump diaphragm member 83 to reciprocate via a connecting rod 86. The pump diaphragm member 83 is disposed and covered around an opening of the lower case 4. The pump diaphragm member 83 is made a header 84 of the diaphragm pump 8 which comes closely into contact and is fixed to the outside of the lower case 4. Thereby, an operating chamber or pump chamber 85 is formed between the pump diaphragm member 83 and the header 84. The opening of the lower case 4 is closed with a fluid tight seal by the header 84.

A terminal means 9 passes through the opening of the lower case 4 and is fixed to the lower case 4 with a fluid sealing state existing between the case 4 and the terminal means 9. The terminal means 9 is made of resin molding and formed integrally with a socket 93. The socket 93 has two lead terminals 91 and 92 therein. The lead terminals 91 and 92 of the terminal means 9 are electrically connected with the outside coupler and the electric power from the power source respectively.

A projection portion member 94 for fixing the lead terminals 91 and 92 is formed integrally on the socket 93. The socket 93 is inserted and fastened to the opening of the lower case 4 with the condition of the holding a sealing ring 95 on the projection portion member 94. The one end of the lead wire 31 and lead wire 32 are connected to the terminals of the microswitch 24, respectively. Another end of lead wire 31 is connected to the inner end of the lead wire 91, and one end of a lead wire 75 is connected to the inner end of the lead wire 92, respectively. Another end of the lead wire 75 is connected to the terminal 74 of the motor 7 and another end of the lead wire 32 is connected to the terminal 74 of the motor 7 respectively.

Figure 2:
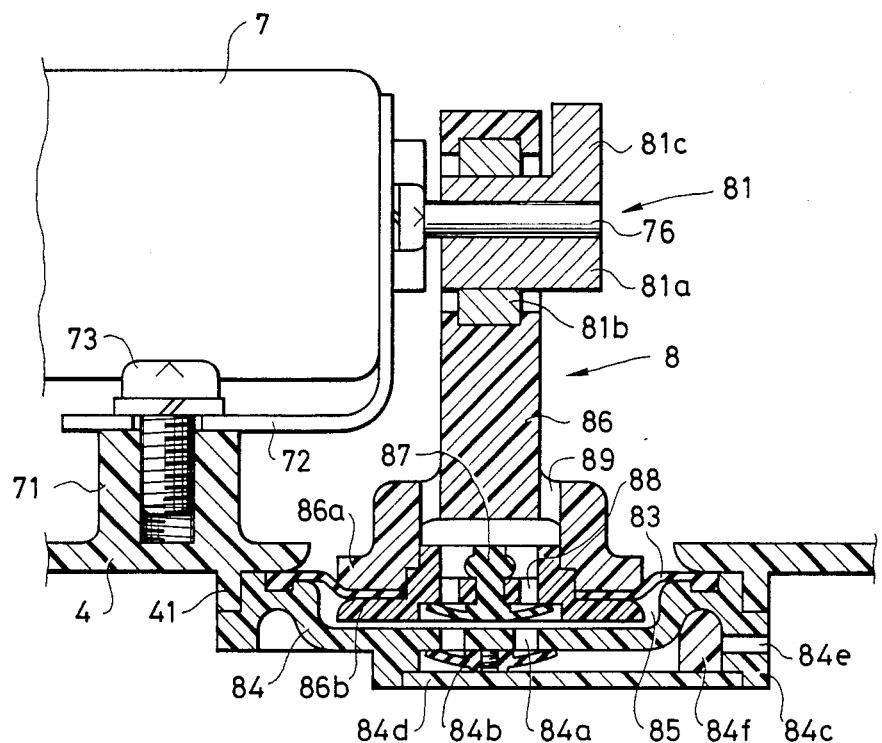
FIG. 2 is an enlarged cross-sectional view of a diaphragm pump section in FIG. 1.
Figure 3:
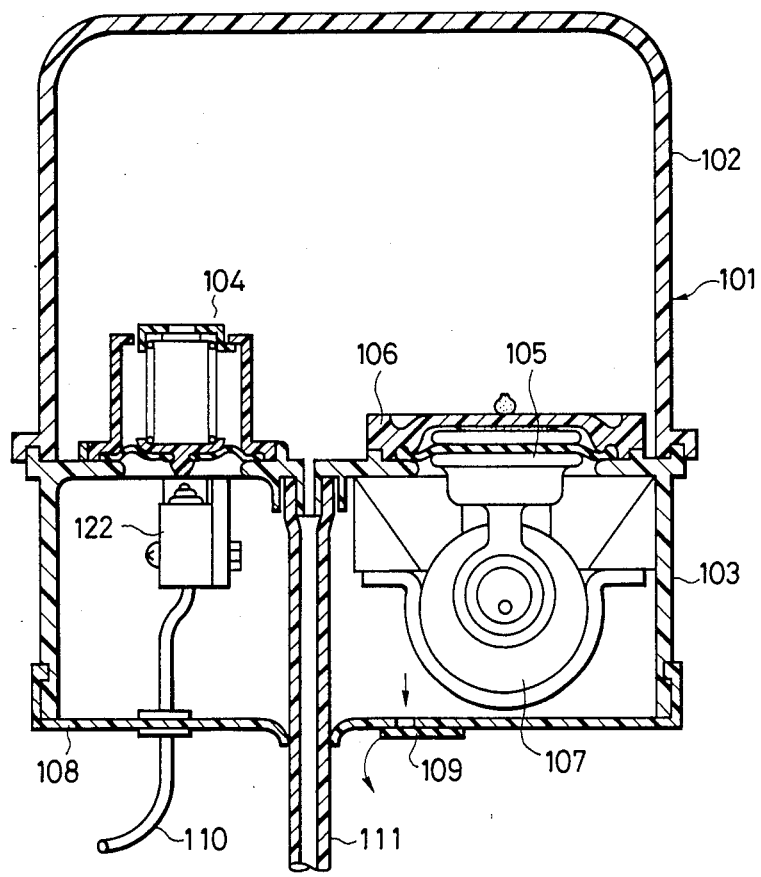
FIG. 3 is a cross-sectional view of another embodiment of a negative pressure supply apparatus according to the present invention.

The construction of the diaphragm pump 8 as the vacuum pump will be described with FIG. 2. An annular projection member 41 is formed integrally with the outside wall of the lower case 4 surrounding an opening of the lower case 4. The outside wall of the head 84 is inserted and fixed within the inside wall of the annular projection member 41. The outer peripheral edge of the pump diaphragm member 83 is inserted closely between the header 84 and the lower case 4 in fluid sealing relationship.

An eccentric cam 81a is fixed to the end of the shaft 76 of the motor 7. A bearing member 81b is fixed to outer peripheral portion of the eccentric cam 81a. A balance weight member 81c is provided integrally with the eccentric cam 81a. The bearing member 81b is fixed to the one end of the connecting rod 86 by molding. A pump diaphragm pressing upper portion member 86a is formed integrally with the lower end of the connecting rod 86.

A pump diaphragm pressing lower portion member 86b extends from the operating chamber 85 to the connecting rod 86 through the pump diaphragm member 83. The pump diaphragm pressing lower portion member 86b is faucet-fitted with the pump diaphragm pressing upper portion member 86a and thereby the pump diaphragm member 83 is fixed closely with fluid sealing state between the pump diaphragm pressing upper portion member 86a and the pump diaphragm pressing lower portion member 86b.

The pump diaphragm pressing upper portion member 86a has a hole for installing an umbrella type valve 87 as an intake valve and a plurality of through holes 88 which open and close by the operating of the umbrella type valve 87. The pump diaphragm pressing upper portion member 86a includes a plurality of through holes 89 thereof. The plurality of the through holes 89 communicate the vacuum tank 1 and the operating chamber 85 in cooperation with the through holes 88 of the pump diaphragm pressing lower portion member 86b. The header 84 includes a plurality of through holes 84a for communicating the operating chamber 85 with the atmosphere.

An umbrella type valve 84b is mounted on lower portion of the header 84. The umbrella type valve 84b opens and closes the through holes 84a and acts as an exhaust valve. An annular projection member 84c is formed integrally with the lower portion of the header 84 and surrounds the umbrella type valve 84b. The annular projection member 84c and a sealing cover 84d fixed to the lower end of the annular projection member 84c forms together an exhaust chamber. The annular projection member 84c forms an exhaust passage 84e and installs a filter 84f at the exhaust chamber side end of the exhaust passage 84e.

An engine negative pressure is introduced into the vacuum tank 1 by the hose via the nipple 5 and the check valve 51. Only when the negative pressure in the vacuum tank 1 is lower than the engine negative pressure, the check valve 51 opens and the air in the vacuum tank 1 flows into the vacuum tank side. When the negative pressure in the vacuum tank 1 goes over the predetermined setting pressure value and approaches towards the atmospheric pressure, the switch diaphragm member 23 of the vacuum switch assembly 2 is lifted up in the cylinder portion 21. Then the microswitch 24 becomes "on" condition, and the motor 7 is connected to outside power source and driven thereby.

By the rotation of the motor 7, the crank mechanism 81 rotates and causes to reciprocate the connecting rod 86 and also causes to reciprocate the pump diaphragm member 83. The volume of the operating chamber 85 formed by the header 84 and the pump diaphragm member 83 is made larger or decreaser according to the reciprocating movement of the pump diaphragm member 83.

By the pressure difference generated during the above operation, the intake valve 87 opens and the exhaust valve 84b closes, thereby the air in the vacuum tank 1 is introduced into the operating chamber 85 via the intake through holes 89 of the pump diaphragm pressing upper portion member 86a and the intake through holes 88 of the pump diaphragm pressing lower portion member 86b. And also, by the pressure difference generated in the above operation, the intake valve 87 closes and the exhaust valve 84b opens, thereby the air in the operating chamber 85 is discharged into the outside of the vacuum tank 1 via the exhaust through holes 84a, the filter member 86f and the exhaust passage 84e.

By the above operation of the diaphragm pump 8, when the negative pressure in the vacuum tank 1 goes over the predetermined setting pressure value and becomes lower than the predetermined setting pressure value or becomes low enough below the atmospheric pressure, the vacuum switch assembly 2 cuts "off", then the diaphragm pump 8 stops.

According to this embodiment of the present invention, the diaphragm pump 8 including the crank mechanism 81 and the vacuum switch assembly 2 are both disposed in the vacuum tank 1, thereby the size of the negative pressure supply apparatus can be reduced drastically.

Furthermore, the vacuum tank 1 plays the roles of the waterproof and dustproof functions of the diaphragm pump 8 and the vacuum switch assembly 2, and the guard function of the rotating portion of the diaphragm pump 8, thereby the number of parts constituting the negative pressure supply apparatus can be reduced.

Another embodiment of the present invention will be described with reference of FIGS. 3-9. A negative pressure supply apparatus for automobiles includes a vacuum tank 101. The vacuum tank 101 is constituted by an upper case 102 and a lower case 103.

A vacuum switch assembly 104, a diaphragm pump 105, a header 106, and a motor 107 for driving the diaphragm pump 105 are mounted on the upper portion of the lower case 103, respectively. A cap 108 is mounted on the lower end of the lower case 103 so as to cover an opening of the lower case 103. A check valve 109 is provided on the cap 108. A lead wire 110 is connected to the vacuum switch assembly 104. A hose 111 is mounted on an opening of the upper portion of the lower case 103.

The check valve 109 compares an engine negative pressure with a negative pressure in the vacuum tank 101. When the engine negative pressure is higher than the negative pressure in the vacuum tank 101, an air in the vacuum tank 101 flows into the engine side.

The vacuum switch assembly 104 comprises mainly a switch diaphragm member 121 for operating a vacuum switch, and a microswitch with a lever 122. The diaphragm pump 105 as a vacuum pump comprises mainly a crank mechanism 141, a connecting rod 142, and a pump diaphragm member 143.

The microswitch with the lever 122 and the motor 107 surround and are guarded by the side wall of the lower case 103. The lower opening of the lower case 103 is covered with the cap 108 made of an elastic thin film material. The hose 111 for introducing the negative pressure and the lead wire 110 penetrate the cap 108. The inner space of the lower case 103 is maintained in an airtight sealing state.

Figure 4:
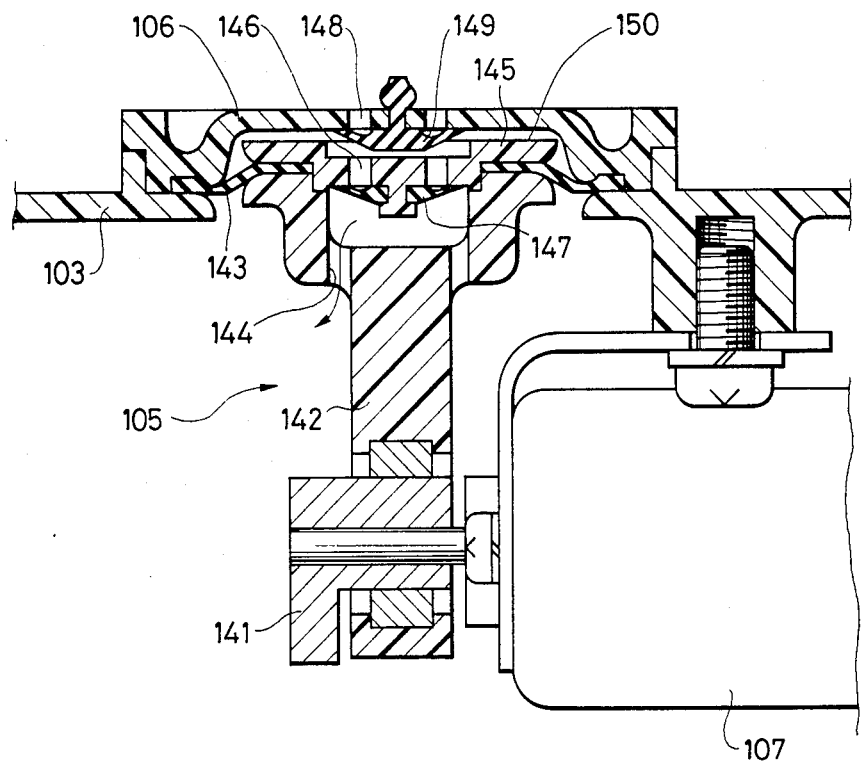
FIG. 4 is an enlarged cross-sectional view of a diaphragm pump section in FIG. 3.

The detailed construction of the diaphragm pump 105 is shown in FIG. 4. The crank mechanism 141 is mounted on the shaft of the motor 107. The connecting rod 142 has a plurality of exhaust through holes 144 at lower portion thereof. A pump diaphragm pressing member 145 presses the pump diaphragm member 143 between the upper portion of the connecting rod 142 and the lower portion thereof.

The pump diaphragm pressing member 145 has a plurality of exhaust through holes 146 therein. An exhaust valve 147 is mounted on the pump diaphragm pressing member 145 and opens or closes the exhaust through holes 146. The header 106 has a plurality of intake through holes 148 therein. An intake valve 149 is mounted on the header 106 and opens or closes the intake through holes 146. A pump chamber or operating chamber 150 is formed between the pump diaphragm member 143 and the header 106.

Figure 5:
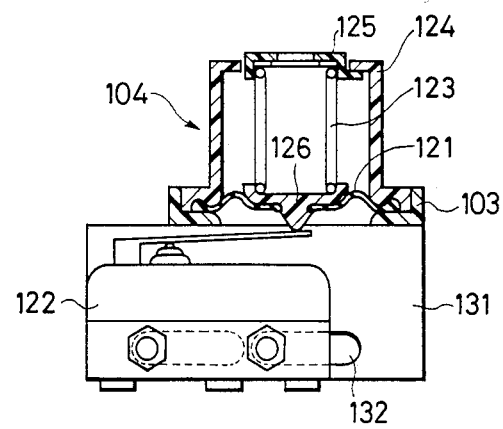
FIG. 5 is an enlarged cross-sectional view of a vacuum switch assembly in FIG. 3.
Figure 6:
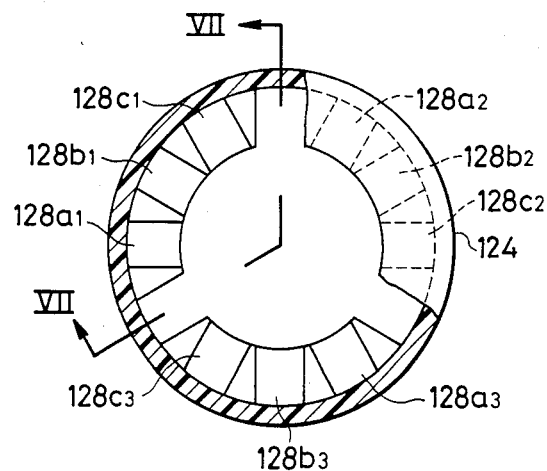
FIG. 6 is a cross-sectional view of a spring holder.
Figure 7:
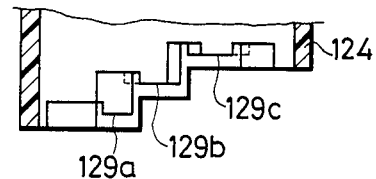
FIG. 7 is a cross-sectional view taken along a line VII—VII in FIG. 6.
Figure 8:
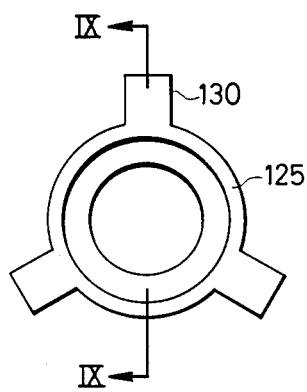
FIG. 8 is a plan view of a spring receiving member.
Figure 9:
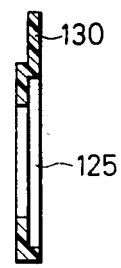
FIG. 9 is a cross-sectional view taken along a line IX—IX in FIG. 8.

The detailed construction of the vacuum switch assembly 104 is shown in FIG. 5. The vacuum switch assembly 104 has a spring member 123 for pressing the switch diaphragm member 121. A spring holder 124 for holding the spring member 123 is mounted on the lower case 103. A spring receiving member 125 is disposed in an opening of the spring holder 124. A switch diaphragm receiving member 126 is mounted on the switch diaphragm member 121. A contact member of the microswitch with the lever 122 contacts the top portion of the switch diaphragm receiving member 126.

The vacuum switch assembly 104 is forced toward the vacuum tank 101 by force of the product of a difference in the pressure between the sum of an atmospheric pressure and an open valve pressure of the check valve 109 and the negative pressure in the vacuum tank 101, and an available pressing area of the switch diaphragm member 121. A force of operating the microswitch with the lever 122 adds to the above force. The spring member 123 gets the balance in opposition to these forces.

The microswitch with the lever 122, the switch diaphragm member 121 and the spring member 123 has scattering, respectively. It is necessary to adjust the operating negative pressure of the vacuum switch assembly 104.

In the above embodiment of the present invention, the constructions of the spring holder 124 and the spring receiving member 125 are shown in FIGS. 6-9. The height of the spring member 123 in the spring holder 124 is varied in three steps. The spring holder 124 has three spring receiving portions 128$a$1-128$a$3, 128$b$1-128$b$3 and 128$c$1-128$c$3 therein. Each of the spring receiving portions 128$a$1-128$a$3, 128$b$1-128$b$3, 128$c$1-128$c$3 comprises three parts respectively, and is disposed at an angle of 120 degrees. The spring holder 124 has an opening 127 at an upper end. The opening 127 of the spring holder 124 has a substantially similar shape to that of the outside appearance of the spring receiving member 125.

The spring receiving member 125 is inserted in the spring holder 124 via the opening 127 of the spring holder 124. The spring receiving member 125 is turned in the spring holder 124 and three projection portions 130 of the spring receiving member 125 are set at one of the spring receiving portions 128$a$1-128$a$3, 128$b$1-128$b$3, 128$c$1-128$c$3. The projection portions 130 of the spring receiving member 125 may be set under a step 129$a$ utilizing the spring receiving portions 128$a$1-128$a$3. The projection portions 130 of spring receiving member 125 may be set under a step 129$b$ or 129$c$ utilizing the spring receiving portions 128$b$1-128$b$3 or 128$c$1-128$c$3, respectively.

Accordingly, the height of the spring member 123 is varied in three steps by the above mentioned methods. Furthermore, the microswitch with the lever 122 is mounted on a microswitch holding plate 131 and able to moved slidably in lateral holes 132 provided within the microswitch holding plate 131. The operating force of the microswitch with the lever 122 is adjusted by the movement position of the microswitch with the lever 122, thereby the operating negative pressure of the vacuum switch assembly 104 can be adjusted freely.

Accordingly in the embodiment of the present invention, the operating negative pressure of the vacuum switch assembly 104 is adjusted by the double adjusting mechanisms, which are the spring member height adjusting mechanism and the microswitch position adjusting mechanism.

In this embodiment, parts of the vacuum switch assembly 104 having the spring member 123, the spring holder 124, the spring receiving member 125, the switch diaphragm receiving member and the switch diaphragm receiving member 126, and parts of the diaphragm pump 105 having the header 106, the pump diaphragm member 143 and the pump diaphragm pressing member 145 are installed on the upper wall of the lower case 103, respectively. The substantial vacuum chamber section of the vacuum tank 101 is formed in the inner space of the upper case 102.

Parts of the vacuum switch assembly 104 having the microswitch with the lever 122 and the microswitch holding plate 131, parts of the pump diaphragm 143 having the crank mechanism 141 and the connecting rod 142, and the motor 107 are disposed in the inner space of the lower case 103, respectively. As the microswitch 122 and the motor 107 are not installed in the inner space of the upper case 102 and disposed separately from the substantial vacuum chamber section formed in the inner space of the upper case 102, therefore, the ignition source of the electrical parts is separated safely from the substantial vacuum chamber section.

When the negative pressure in the vacuum tank 101 becomes lower, the vacuum switch assembly 104 operates and then the motor 107 is conducted, thereby the diaphragm pump 105 is driven. The enlargement or decrease of the pump chamber or operating chamber 150 formed by the pump diaphragm member 143 and the header 106 is converted from the rotating movement of the motor 17 via the oscillating movement by the crank mechanism 141. The pump diaphragm member 143 is shifted up or down by the connecting rod 142 and the pump diaphragm pressing member 145.

When the volume of the pump chamber 150 becomes larger, the pump chamber 150 becomes the negative pressure condition in proportion to the change of volume of the pump chamber 150. Then the intake valve 149 opens via the intake holes 148, the air in the vacuum tank 101 flows into the pump chamber 150 via the intake through holes 148.

When the volume of the pump chamber 150 becomes decreased, the intake valve 149 closes, the pressure of the air in the pump chamber 150 increases in proportion to the change of volume of the pump chamber 150. Then the exhaust valve 147 opens via the exhaust through holes 146, the air in the pump chamber 150 flows out the outside of the diaphragm pump 105 via the exhaust through holes 146 and the exhaust through holes 144. The air exhausted from the diaphragm pump 105 is discharged to the atmosphere via the check valve 109.

The difference in pressure between the open valve pressure of the check valve 109 and the pressing pressure of the microswitch 122 becomes the difference in pressure of the vacuum switch assembly 104. The microswitch 122 can be used a general purpose microswitch by adjusting the open valve pressure of the check valve 109.

According to the second embodiment of the present invention, as the microswitch 122 and the motor 107 are disposed separately from the substantial vacuum chamber section formed in the inner space of the upper case 102, the occurrence of the ignition can be prevented. Furthermore, as the height of the spring member 123 in the spring holder 124 is varied in three steps by three spring receiving portions 128a1–128a3, 128b1–128b3 and 128c1–128c3 provided the spring holder 124, therefore, the strength of the spring member 123 can be varied three steps.

The position of the microswitch with the lever 122 is varied with respect to the microswitch holding plate 131, and then the operating force of the microswitch with the lever 122 is varied, therefore, the operating negative pressure of the vacuum switch assembly 104 can be adjusted thereby.

We claim:

1. A negative pressure supply apparatus for automobiles comprising: a vacuum tank section being connected to an engine intake manifold; and a vacuum pump section for generating compulsorily a negative pressure so as to maintain the negative pressure at a predetermined setting pressure value; said vacuum pump section having a pump means for discharging an air in said vacuum tank section to outside of said vacuum tank section, a motor for driving said pump means, and an electric wire member being connected to said pump driving motor, wherein said vacuum pump section is disposed in said vacuum tank section;
a vacuum switch assembly is disposed integrally on a wall of said vacuum tank section and connected between said pump driving motor and said electric wire member, said switch assembly closes so as to permit supply of an electric power to said pump driving motor when a negative pressure in said vacuum tank section is detected and approaches an atmospheric pressure exceeding the predetermined setting pressure value, and
a connect means is disposed integrally on the wall of said vacuum tank section and connects between said vacuum tank section and the engine intake manifold.

2. A negative pressure supply apparatus for automobiles comprising: a vacuum tank being connected to an engine intake manifold and storing a negative pressure therein thereby the negative pressure is supplied to a control apparatus as occasion demands; a pressure detecting means for detecting a pressure in said vacuum tank; and a pump section being driven by said pressure detecting means and discharging an air in said vacuum tank into an atmosphere; characterized in that
a part of said pressure detecting means and a part of said pump section are formed respectively at a wall of said vacuum tank, and thereby said pressure detecting means and said pump section are formed integrally on said vacuum tank.

3. A negative pressure supply apparatus for automobiles according to claim 2, wherein said pressure detecting means comprises a switch diaphragm member, a spring means for pressing said switch diaphragm member, a spring adjusting means for adjusting said spring means, a microswitch means being disposed oppositly against said switch diaphragm member, and a fixing means for fixing said microswitch means.

4. A negative pressure supply apparatus for automobiles according to claim 3, wherein said spring adjusting means includes a plurality of stepped portions so as to adjust strength of said spring member.

5. A negative pressure supply apparatus for automobiles according to claim 3, wherein said microswitch means is a microswitch with a lever, and said microswitch fixing means adjusts a necessary force for operating said microswitch with the lever according to movement of said microswitch with the lever.

6. A negative pressure supply apparatus for automobiles according to claim 3, wherein said vacuum tank comprises an upper case and a lower case; said switch diaphragm member, said spring means and said spring adjusting means of said pressure detecting means are disposed respectively on an upper side of a wall of said lower case; and said microswitch means and said microswitch fixing means are disposed respectively on a lower side of the wall of said lower case.

7. A negative pressure supply apparatus for automobiles according to claim 2, wherein said pump section comprises a diaphragm type pump mechanism and a motor for driving said diaphragm type pump mechanism, said diaphragm type pump mechanism includes a pump diaphragm member covering an opening of a wall of said vacuum tank, a header sandwiching with an airtight sealing state in an outer peripheral of said pump diaphragm member, a connection rod means being oscillated by a rotation of said pump mechanism driving motor, and a pump diaphragm supporting means for supporting said pump diaphragm member, an inner periphery of said pump diaphragm member is sandwiched in between said connecting rod means and said pump diaphragm member, said heater provides an intake port therein and an intake valve for opening or closing said intake port, said pump diaphragm supporting means provides an exhaust passage therein and an exhaust valve for opening or closing said exhaust passage, and said connecting rod means provides an discharge port for discharging the air in said vacuum tank into the atmosphere.

8. A negative pressure supply apparatus for automobiles according to claim 7, wherein said vacuum tank having an upper case and a lower case; said header, said pump diaphragm supporting member and said said pump diaphragm member of said diaphragm type pump mechanism are disposed respectively on an upper side of a wall of said lower case; said connecting rod means of said diaphragm type pump mechanism is disposed on a lower side of the wall of said lower case; and said pump mechanism driving motor is disposed on the lower side of the wall of said lower case.

9. A negative pressure supply apparatus for automobiles according to claim 6 or claim 8, wherein said microswitch means and said pump mechanism driving motor are disposed respectively in a side of said lower case so as to guard said microswitch means and said pump mechanism driving motor.

10. A negative pressure supply apparatus for automobiles according to claim 9, wherein a cap is provided to said lower case, said cap passes through a lead wire means for supplying an electric power and provides with a check valve thereon, an air is exhausted by said diaphragm type pump mechanism and passes through said check valve, and a space in said lower tank is maintained in an airtight sealing state.

11. A negative pressure supply apparatus for automobiles comprising: a vacuum tank being connected to an engine intake manifold and storing a negative pressure therein, thereby the negative pressure is supplied to a control apparatus as occasion demands; a pressure detecting means for detecting a pressure in said vacuum tank; a motor-driven pump section having a motor for discharging an air in said vacuum tank to an atmosphere; said motor operates when a pressure detected by said pressure detecting means goes over a predetermined setting pressure value and becomes toward an atmospheric pressure, and said motor-driven pump section comprising a pump means having a diaphragm type pump mechanism;
wherein said pressure detecting means is disposed integrally on a wall of said vacuum tank, and a connect means is disposed integrally on the wall of said vacuum tank, and connects betewen said vacuum tank and the engine intake manifold of the automobile;
said negative pressure supply apparatus further comprising: a fixing means for fixing said motor-driven pump section at the wall of said vacuum tank; a first intake means for inhaling an air in said vacuum tank into said pump means of said motor-driven pump section; a first discharging means for communicating an atmosphere with an exhaust passage of said motor-driven pump section through the wall of said vacuum tank with holding an airtight sealing state between said vacuum tank and the atmosphere; and an electric wire member supplying an electric power to said motor of said motor-driven pump section from an outside with maintaining an airtight sealing state between said vacuum tank and the atmosphere;
said diaphragm type pump mechanism comprises a crank mechanism being connected to a shaft of said motor, a connecting rod means being reciprocated by said crank mechanism, a pump diaphragm member being fixed to said connecting rod means; a header for forming an operating chamber in cooperation with said pump diaphragm member; a second intake means for inhaling an air in said vacuum tank into said operating chamber when the volume of said operating chamber becomes enlarged; and a second discharging means for discharging an air in said operating chamber into an outside of said vacuum tank when the volume of said operating chamber become decreased.

12. A negative pressure supply apparatus for automobiles according to claim 11, wherein an inner periphery of said pump diaphragm member is sandwiched between said connecting rod means and a pump diaphragm supporting means mounted on a bottom portion of said connecting rod means, said connecting rod means provides an intake port therein, said pump diaphragm supporting means provides an intake port therein and an intake valve for opening or closing said intake port of said pump diaphragm supporting means, and said header provides an exhaust passage therein and an exhaust valve for opening or closing said exhaust passage, and a discharge port for discharging the air in said operating chamber to outside of said vacuum tank.

13. A negative pressure supply apparatus for automobiles according to claim 11, wherein a pump diaphragm pressing upper portion member is formed integrally with a lower end of said connecting rod means, a pump diaphragm pressing lower portion member extends from said operating chamber to said connecting rod means through said pump diaphragm member, said pump diaphragm pressing upper portion member includes a first through hole, said pump diaphragm pressing lower portion member includes a second through hole, a first valve is mounted on a lower portion of said pump diaphragm pressing lower portion member, and said first valve opens and closes said second through hole of said pump diaphragm pressing lower portion member.

14. A negative pressure supply apparatus for automobiles according to claim 13, said header includes a third through hole, a second valve is mounted on a lower portion of said header, and said second valve opens and closes said third through hole of said header and acts as an exhaust valve.

15. A negative pressure supply apparatus for automobiles according to claim 14, wherein a member for surrounding said second valve is formed by the lower portion of said header, a sealing cover is fixed to said second valve surrounding member, and said second valve surrounding member and said sealing cover form together an exhaust chamber.

16. A negative pressure supply apparatus for automobiles according to claim 15, wherein said second valve surrounding member forms an exhaust passage and mounts a filter at an exhaust chamber side end of said exhaust passage.

* * * * *